(12) United States Patent
Ngai

(10) Patent No.: US 11,369,079 B2
(45) Date of Patent: Jun. 28, 2022

(54) PAD HOLDER FOR SECURING A TRAINING PAD USED TO HOUSETRAIN PETS

(71) Applicant: Kenny Ngai, Union, NJ (US)

(72) Inventor: Kenny Ngai, Union, NJ (US)

( * ) Notice: Subject to any disclaimer, the term of this patent is extended or adjusted under 35 U.S.C. 154(b) by 793 days.

(21) Appl. No.: 16/208,108

(22) Filed: Dec. 3, 2018

(65) Prior Publication Data

US 2019/0166791 A1 Jun. 6, 2019

Related U.S. Application Data

(60) Provisional application No. 62/593,389, filed on Dec. 1, 2017.

(51) Int. Cl.
| | | |
|---|---|---|
| *F16M 13/00* | (2006.01) | |
| *A01K 1/015* | (2006.01) | |
| *A01K 1/01* | (2006.01) | |
| *A01K 15/02* | (2006.01) | |
| *F16M 13/02* | (2006.01) | |

(52) U.S. Cl.
CPC .......... *A01K 1/0157* (2013.01); *A01K 1/0107* (2013.01); *A01K 15/02* (2013.01); *F16M 13/022* (2013.01)

(58) Field of Classification Search
CPC .... A01K 1/0157; A01K 1/0107; A01K 15/02; F16M 13/022
See application file for complete search history.

(56) References Cited

U.S. PATENT DOCUMENTS

| | | | |
|---|---|---|---|
| 5,355,837 A * | 10/1994 | Reyes ................. | A01K 1/0107 119/161 |
| 6,295,658 B1 * | 10/2001 | Jenkins ............. | A47G 27/0225 4/251.1 |
| 8,113,146 B2 | 2/2012 | Askinasi | |
| 9,723,808 B2 | 8/2017 | Nakata et al. | |
| 9,737,045 B1 * | 8/2017 | Scanlan ............... | A01K 1/0107 |
| 9,980,622 B2 * | 5/2018 | Soller ..................... | A47L 13/46 |
| 2006/0107480 A1 * | 5/2006 | De Grandi ............. | A47L 23/26 15/215 |
| 2014/0053785 A1 | 2/2014 | Christianson | |
| 2017/0196192 A1 | 7/2017 | Martin et al. | |

FOREIGN PATENT DOCUMENTS

WO    WO2012173895 A1    12/2012

* cited by examiner

*Primary Examiner* — Amy J. Sterling

(57) ABSTRACT

A pad holder for a training pad used to housetrain pets secures the training pad onto a desired anchoring point. The pad holder includes a plurality of pad fasteners, a mounting structure, and a plurality of supports. The plurality of pad fasteners and the plurality of supports are mounted onto opposite sides of the mounting structure. The mounting structure is used to arrange the plurality of pad fasteners into a single-file line. This allows the absorbent pad to be mounted and oriented parallel to the ground. The plurality of supports is used to fasten the mounting structure to the desired anchoring point.

8 Claims, 9 Drawing Sheets

PAD HOLDER FOR SECURING A TRAINING PAD USED TO HOUSETRAIN PETS

The current application claims a priority to the U.S. Provisional Patent application Ser. No. 62/593,389 filed on Dec. 1, 2017. The current application is filed on Dec. 3, 2018 while Dec. 1, 2017 was on a weekend.

FIELD OF THE INVENTION

The present invention generally relates a pad holder for securely holding a training pad for housetraining pets. More specifically, the present invention utilizes a mounting structure with a plurality of pad fasteners to securely mount the training pad onto a desired anchoring point.

BACKGROUND OF THE INVENTION

Pets provide a great deal of happiness to their owners. While cats and dogs are generally considered the most common pets, a variety of animals can be domesticated, and can thus provide companionship that is beneficial, and oftentimes even therapeutic. To this end, pet owners typically invest a large amount of money in pet care products.

Although cats generally prefer urinating into their litter box, dogs are less likely to relieve themselves at a designated area. Often, an adjustment period is required before an adopted or newborn puppy is fully housetrained. This can be a difficult period for the pet owner as the dog is likely to relieve themselves wherever it wants. Oftentimes, the dog prefers to urinate next to a large structure such as a wall or the edges and corners of a furniture. To this end, a variety of absorbent pads and mats have been developed to soak up the urine. These devices are limited, unfortunately, by the pets themselves, who often shuffle their feet and move the pads and mats before urinating, rendering them useless. As such, a device to securely mount the absorbent pad over the desired urination spot of the dog is required.

The present invention addresses this issue. The present invention is training pad holder for securely holding a training pad onto an anchoring point. The present invention utilizes a mounting structure that enables the owner to suspend an absorbent pad or mat over a particular area or piece of furniture. By arranging the present invention over areas in which the dog is likely to urinate on, the absorbent pad can be securely held in place while the dog urinates on it. The present invention also includes a variety of mounting means, including screws, hook-and-loop fasteners, adhesives, and/or the like to ensure a secure fit between the mounting structure and the desired anchoring point. This enables the owner to apply the present invention to a permanent fixture such as a wall, or as a temporary structure on a couch or other furniture.

DETAILED DESCRIPTION OF THE INVENTION

All illustrations of the drawings are for the purpose of describing selected versions of the present invention and are not intended to limit the scope of the present invention.

The present invention is a pad holder for a training pad used to housetrain pets. More specifically, the present invention allows an absorbent pad to be mounted to an anchoring point such as a wall, a furniture, or a similar fixture. Preferably, the absorbent pad is placed over the preferred urination spot of the pet. This allows the pet to become comfortable urinating on the absorbent pad, thus housetraining the pet.

Figure 1:
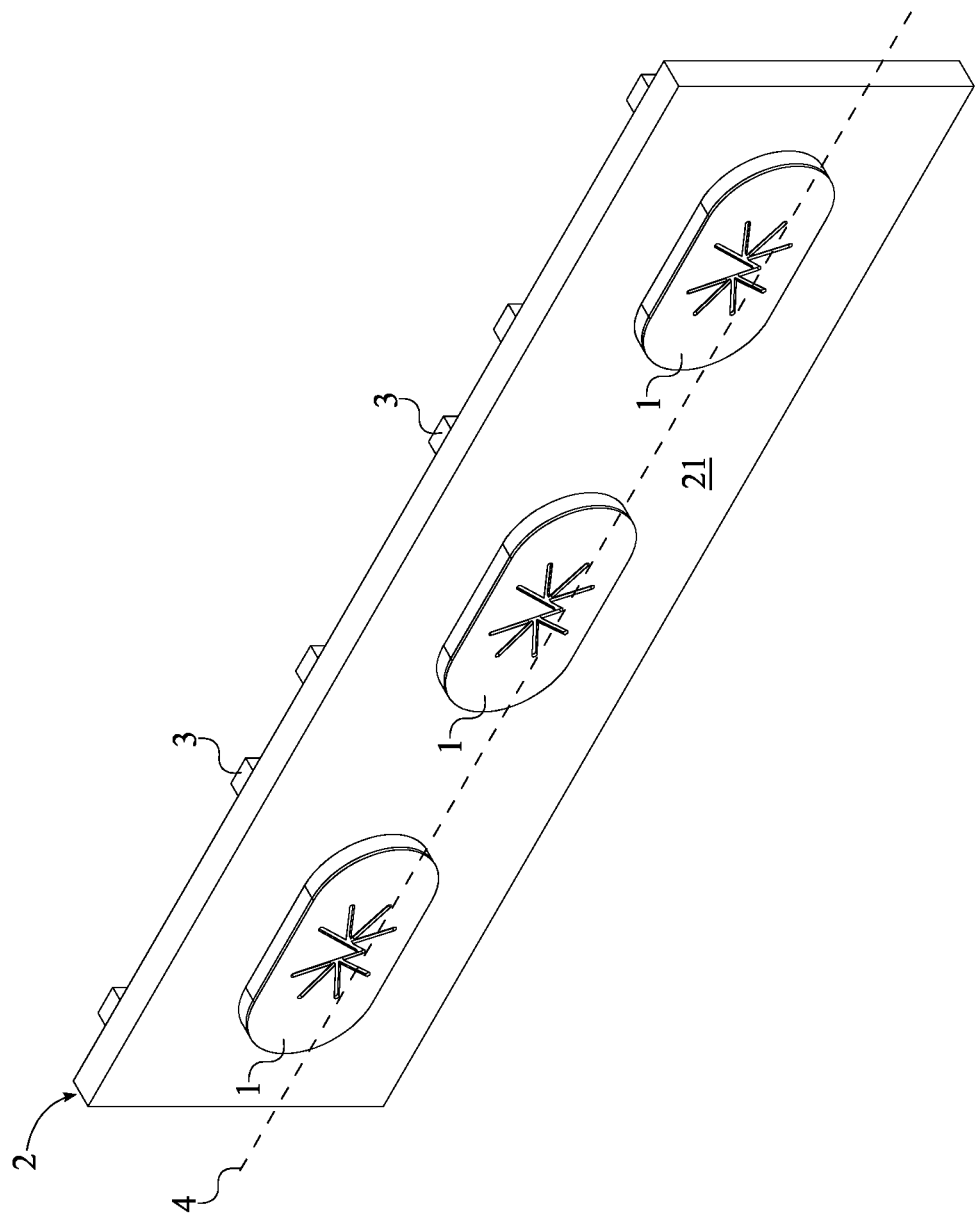
FIG. 1 is a front perspective view of the present invention.
Figure 2:
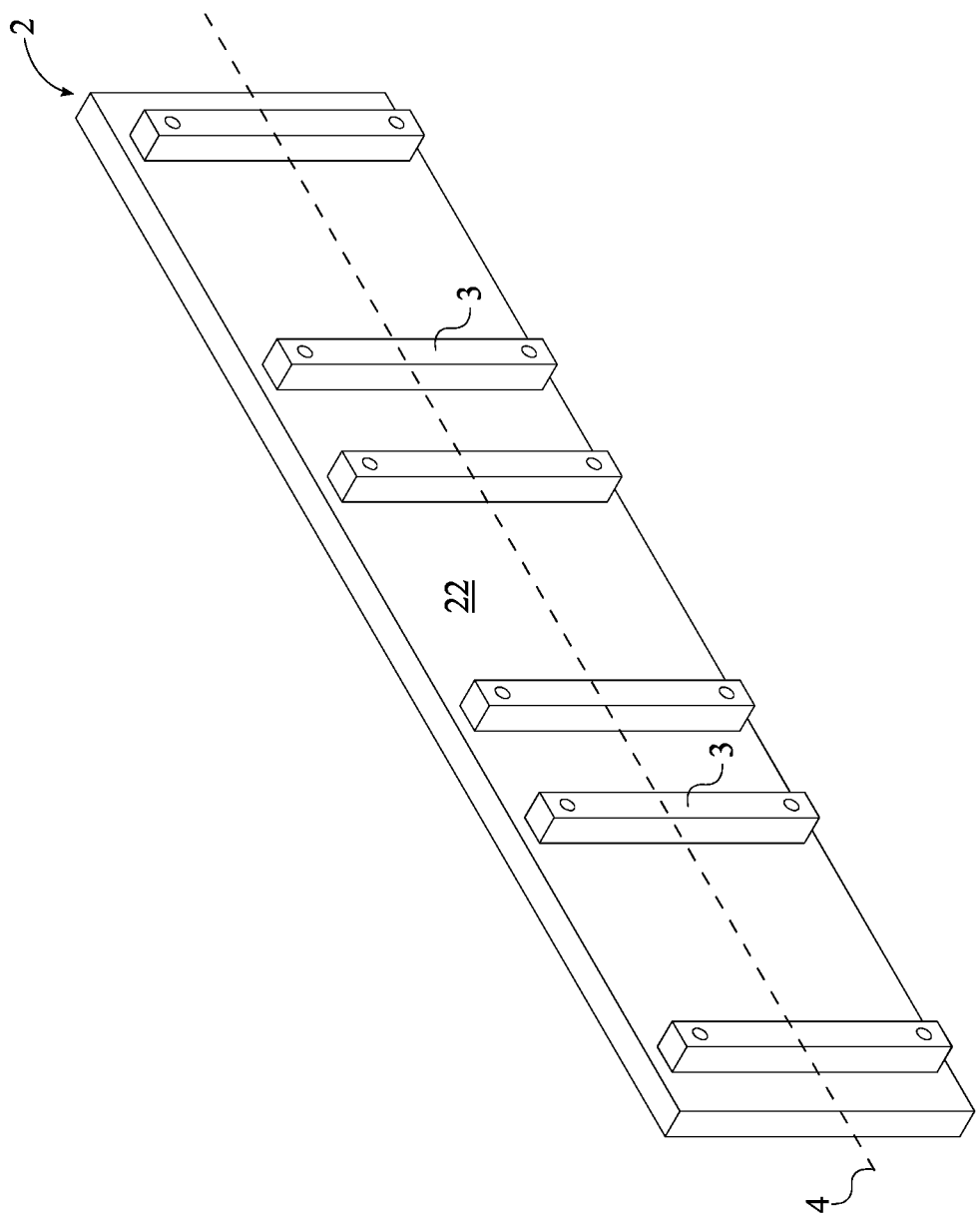
FIG. 2 is a rear perspective view showing the opposite orientation of the second surface to the first surface.

Referring to FIG. 1 and FIG. 2, the preferred embodiment of the present invention comprises a plurality of pad fasteners 1, a mounting structure 2, and a plurality of supports 3. The plurality of pad fasteners 1 fastens the absorbent pad onto the mounting structure 2. In the preferred embodiment, each of the plurality of pad fasteners 1 is a grommet with flexible teeth that grip onto the edge of the absorbent pad. In alternate embodiments of the present invention, the plurality of pad fasteners 1 may be an adhesive strip, a clip, a clamp, or any such mechanical fasteners. The mounting structure 2 is an elongated structure that runs parallel to the ground when mounted to the anchoring point. The mounting structure 2 may have a circular or rectangular cross section depending on the anchoring point utilized. For example, if the anchoring point is a flat planar surface such as a wall, the mounting structure 2 may have a rectangular cross-section. Further, the mounting structure 2 may be positioned parallel and offset from the wall. In another example, if the anchoring point is uneven or comprised of multiple points, the mounting structure 2 may be an elongated rod with a circular cross-section. Accordingly, the plurality of pad fasteners 1 is laterally mounted onto the mounting structure 2. Further, the plurality of pad fasteners 3 is distributed along a longitudinal axis 4 of the mounting structure 2. As such, the plurality of pad fasteners 1 is positioned along the length of the mounting structure 2. This allows the absorbent pad to be laid flat on the ground once it is attached to the plurality of pad fasteners 1.

The plurality of supports 3 allows the mounting structure 2 to mount onto the preferred anchoring point. As such, the plurality of supports 3 is laterally mounted onto the mounting structure 2 and positioned opposite of the plurality of pad fasteners 1. Further, the plurality of supports 3 is distributed along the longitudinal axis 4 of the mounting structure 2. In the preferred embodiment, each of the plurality of supports 3 is a rectangular member with holes drilled into the side. The holes allow the plurality of supports 3 to be screwed onto the desired anchoring point. The plurality of supports 3 may be constructed out of the same material as the mounting structure 2 or may be constructed out of a separate material that is fastened onto the mounting structure 2.

In the preferred embodiment, the mounting structure 2 is a flat rectangular plate made of lightweight yet sturdy materials such as wood, high-density plastics, or low-density metals. As such, the mounting structure 2 comprises a first surface 21 and a second surface 22. The first surface 21 and the second surface 22 are positioned opposite each other about the mounting structure 2. Preferably, the first surface 21 corresponds to the side that faces away from the anchoring point, whereas the second surface 22 corresponds to the side that faces towards the anchoring point. As such the plurality of pad fasteners 1 is connected onto the first surface 21.

Figure 3:
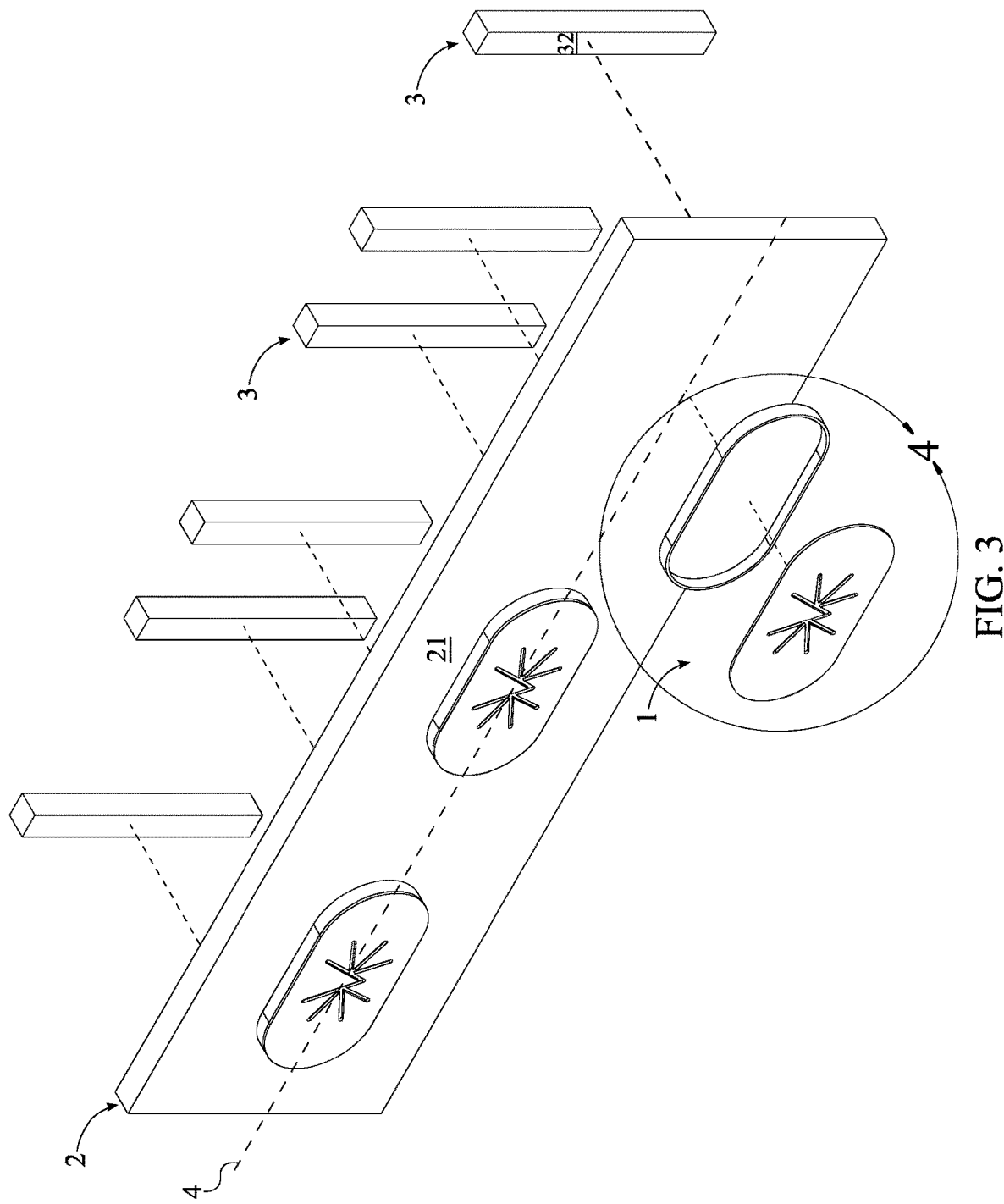
FIG. 3 is an exploded front perspective view showing the connection between the flexible panel and the oblong tube.
Figure 4:
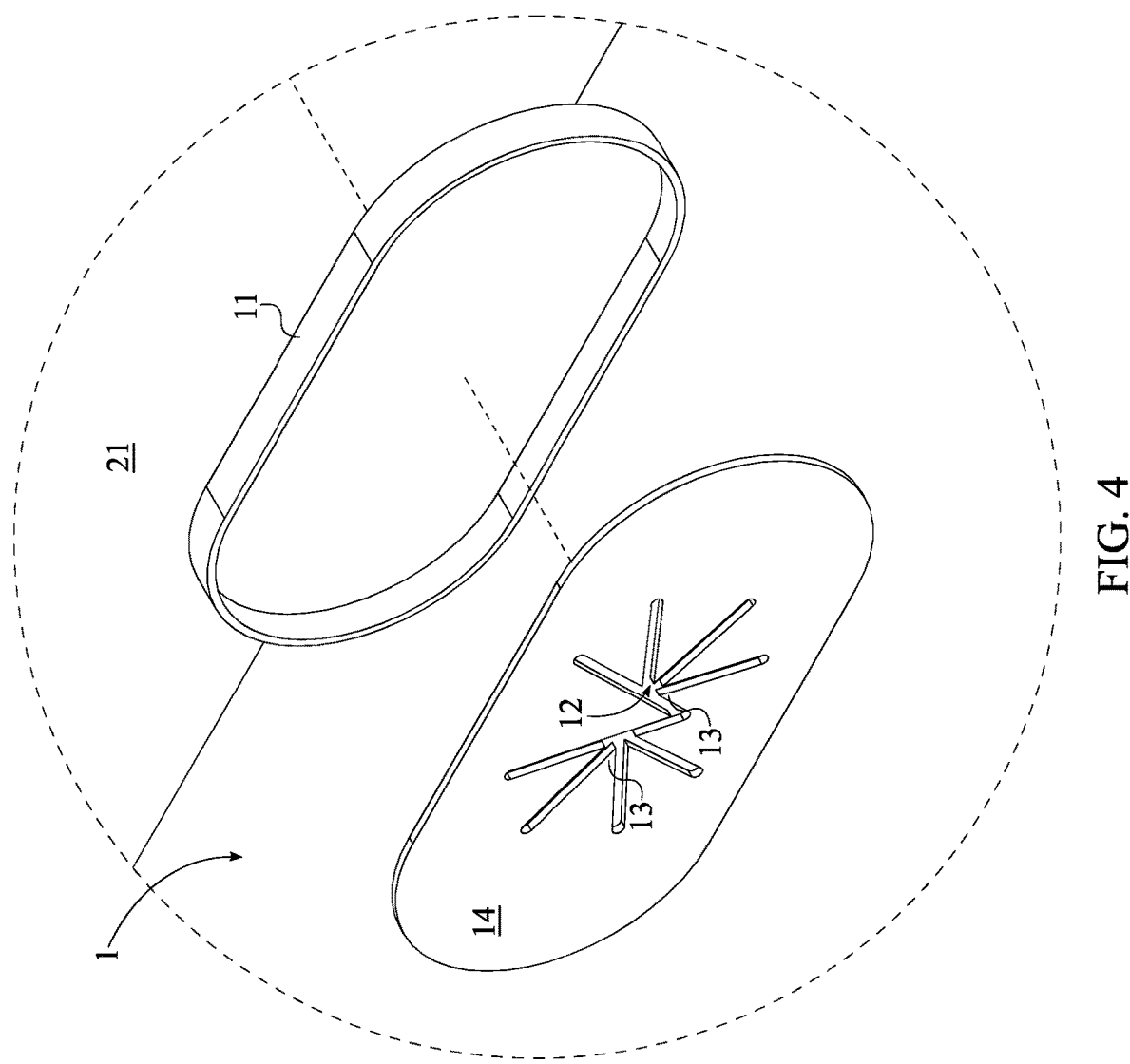
FIG. 4 is a detail view taken about section 4 in FIG. 3, showing the plurality of gripping teeth being delineated by the opening.

Referring to FIG. 3 and FIG. 4, in this embodiment, each of the plurality of pad fasteners 1 comprises an oblong tube 11, a flexible panel 14, an opening 12, and a plurality of gripping teeth 13. The oblong tube 11 is connected laterally onto the first surface 21. Further, the flexible panel 14 is terminally connected to the oblong tube 11, opposite the first surface 21. In the preferred implementation, the edge of the absorbent pad is pushed into the oblong tube 11 through the flexible panel 14 and trapped between the plurality of gripping teeth 13. This prevents the absorbent pad from separating from the oblong tube 11. Preferably, the plurality of gripping teeth 13 is constructed by making cuts into the flexible panel 14. This also creates the opening 12 with which to insert the absorbent pad. As such, the opening 12 traverses through the flexible panel 14 into the oblong tube 11. Further, plurality of gripping teeth 13 is delineated by the opening 12. Preferably, each of the plurality of gripping teeth 13 is triangular in shape to securely grip onto the absorbent pad. Alternately, the plurality of gripping teeth 13 can also have a blunt shape to prevent tearing or damaging the absorbent pad. In the preferred implementation, pushing into the absorbent pad widens the opening 12 and allows the absorbent pad pass through. In contrast, pulling the absorbent pad constricts the opening 12 and causes the plurality of gripping teeth 13 to grip onto the absorbent pad. This prevents the absorbent pad from slipping out. However, with sufficient pulling force, the absorbent pad can easily be detached from the plurality of pad fasteners 1.

Figure 5:
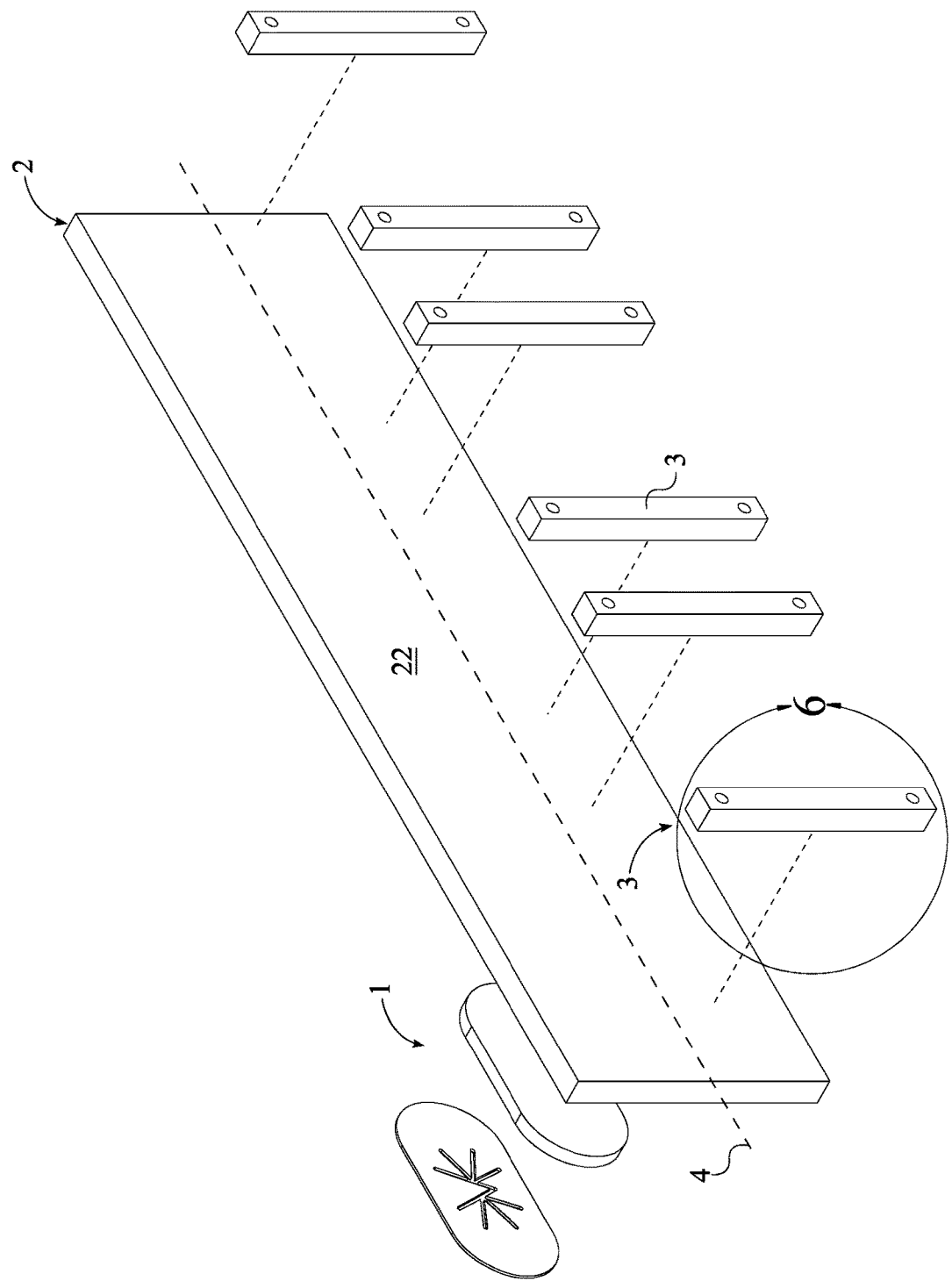
FIG. 5 is an exploded rear perspective view showing the connection between the plurality of supports and the mounting structure.
Figure 6:
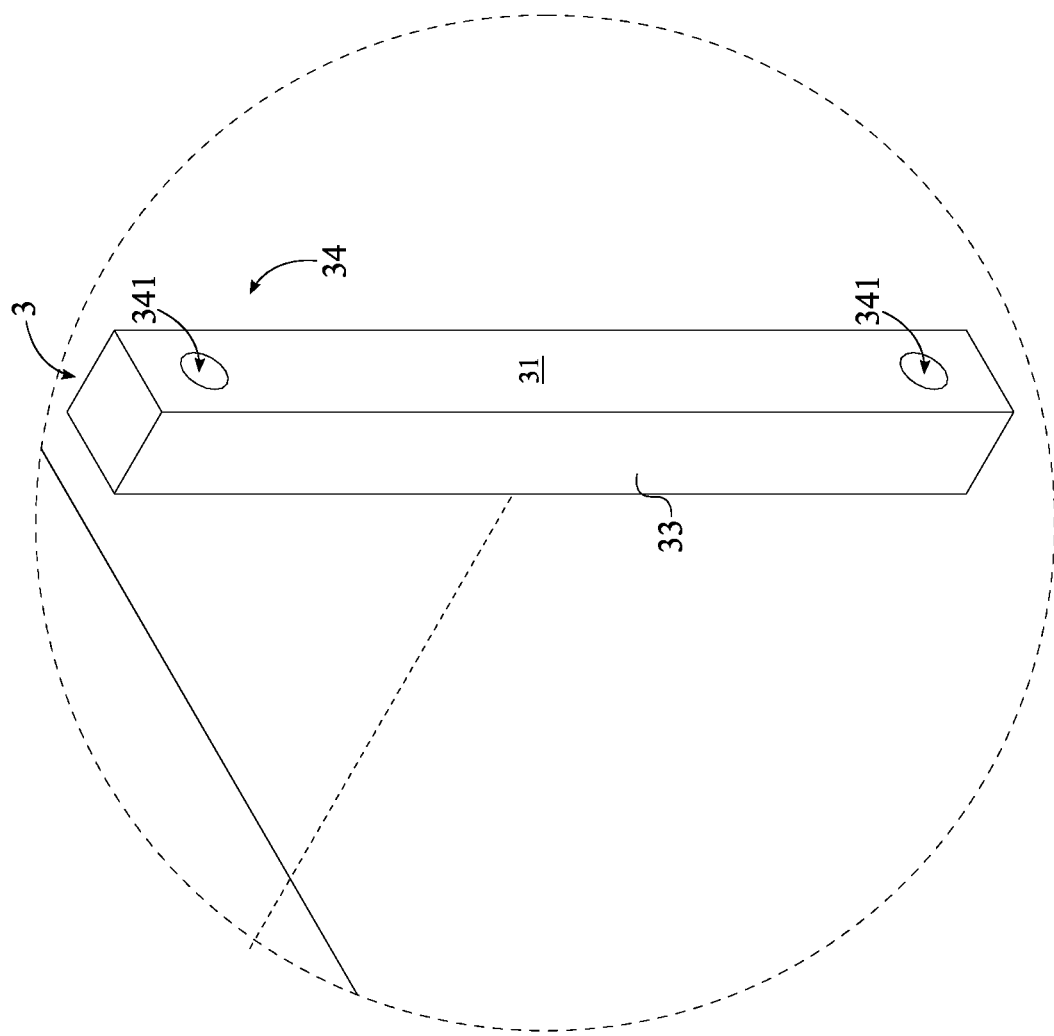
FIG. 6 is a detail view taken about section 6 in FIG. 5, showing an embodiment of the plurality of supports with the plurality of threaded holes.

Referring to FIG. 5 and FIG. 6, in the preferred embodiment, each of the plurality of supports 3 comprises a pillar 33 and a mounting mechanism 34. The pillar 33 allows the mounting mechanism 34 to be connected onto the mounting structure 2 without effecting the structural integrity of the mounting structure 2. As such, the pillar 33 is laterally mounted onto the second surface 22. This orients the pillar 33 facing towards the desired anchoring point. Further, the mounting mechanism 34 is laterally mounted onto the pillar 33, opposite the second surface 22. Preferably, the pillar 33 is oriented perpendicular to the longitudinal axis 4 to maximize the number of supports that can be fitted on the mounting structure 2. Alternately, the pillar 33 may be oriented parallel or at an angle to the longitudinal axis 4 depending.

As can be seen in FIG. 3 and FIG. 6, in the preferred embodiment of the present invention, the mounting mechanism 34 comprises a plurality of threaded holes 341. Further, each of the plurality of supports 3 further comprises a mounting side 31 and a connecting side 32. The mounting side 31 and the connecting side 32 are positioned opposite each other about the pillar 33. The connecting side 32 is oriented facing the second surface 22, whereas the mounting side 31 is oriented facing the desired anchoring point. This allows the connecting side 32 to be mounted coincident to the second surface 22. The plurality of threaded holes 341 traverses into the mounting side 31 of the pillar 33. Further, the plurality of threaded holes 341 is distributed along the length of the pillar 33. This allows each of the plurality of threaded holes 341 to be secured with a screw. Preferably, the screw is used to interlock the anchoring point and the pillar 33, thereby securing the mounting structure 2 to the anchoring point.

Figure 7:
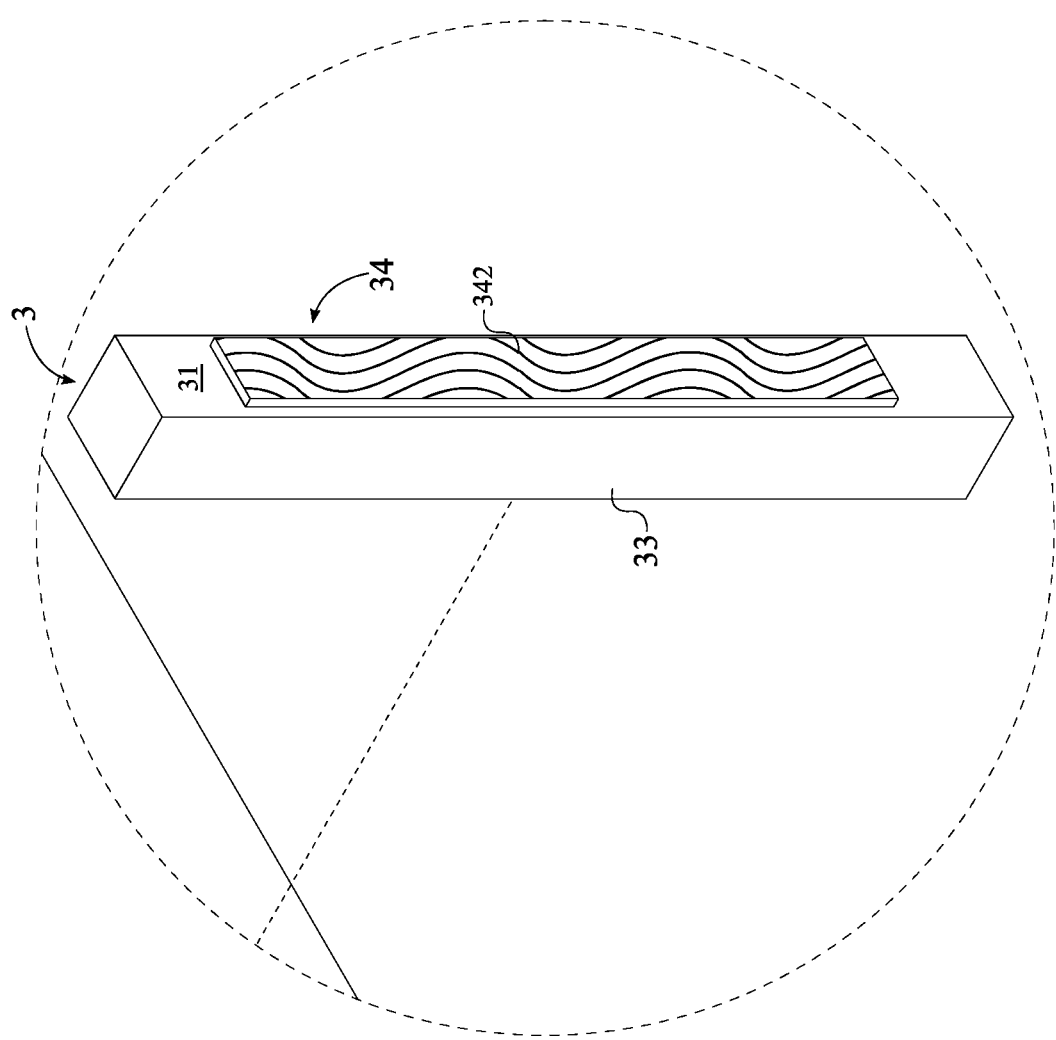
FIG. 7 is a detail view taken about section 6 in FIG. 5, showing an embodiment of the plurality of supports with the adhesive strip.

Referring to FIG. 7, in another possible embodiment, the mounting mechanism 34 comprises an adhesive strip 342. The adhesive strip 342 is thin plastic strip coated with high-strength adhesives such as epoxies and/or resin. In this embodiment, the adhesive strip 342 is connected onto the mounting side 31, opposite the connecting side 32. This allows the pillar 33 to connect onto the anchoring point in a releasable manner.

Figure 8:
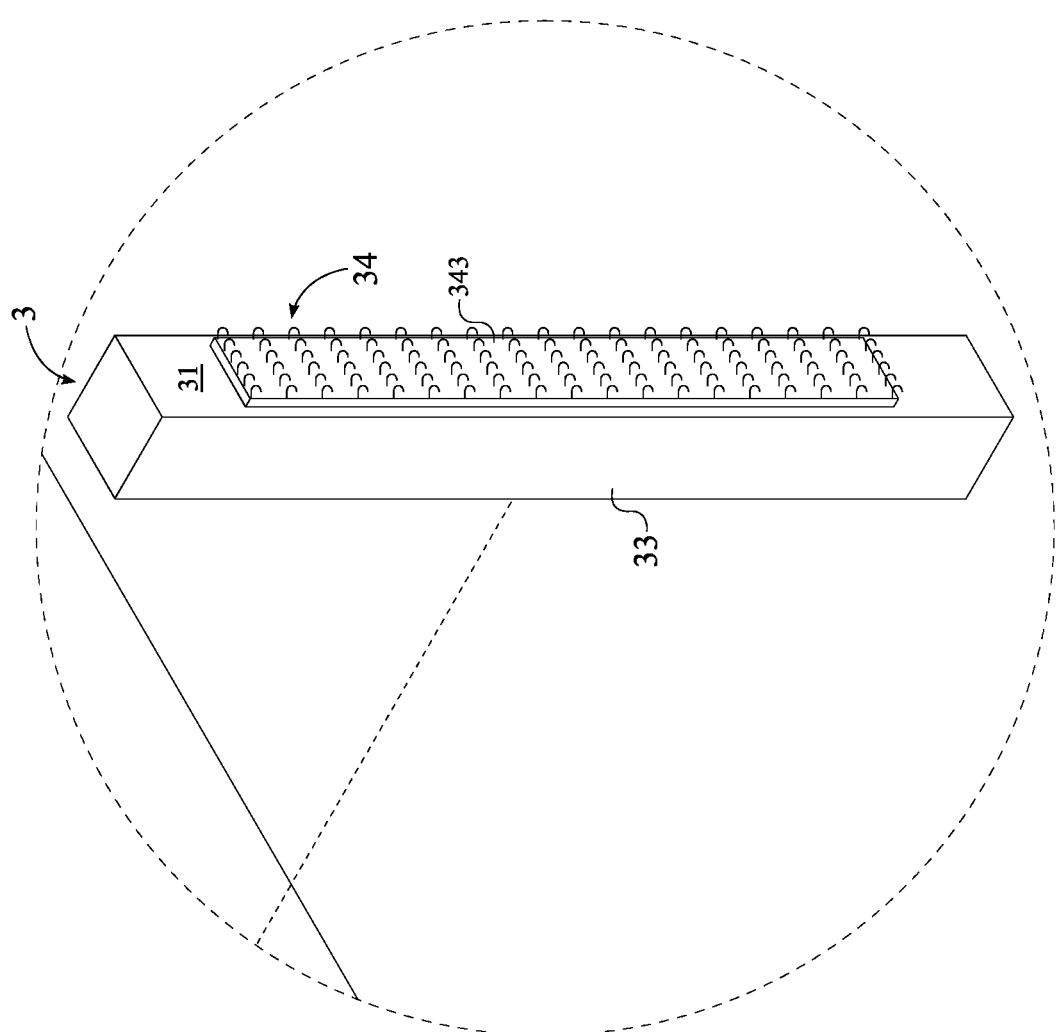
FIG. 8 is a detail view taken about section 6 in FIG. 5, showing an embodiment of the plurality of supports with the hook portion of a hook-and-loop fastener.

Referring to FIG. 8, in another possible embodiment, the mounting mechanism 34 comprises a hook portion 343 of a hook-and-loop fastener. In this embodiment, a loop portion of the hook-and-loop fastener is attached to the desired anchoring point, to allow the hook portion 343 to releasably connect thereon. Accordingly, the hook portion 343 is connected onto the mounting side 31, opposite the connecting side 32. To mount the mounting structure 2, the hook portion 343 is positioned coincident to the loop portion on the anchoring point, thereby creating a releasable connection. The application of a pulling force perpendicular to the pillar 33 disengages the hook portion 343 from the loop portion on the anchoring point.

Figure 9:
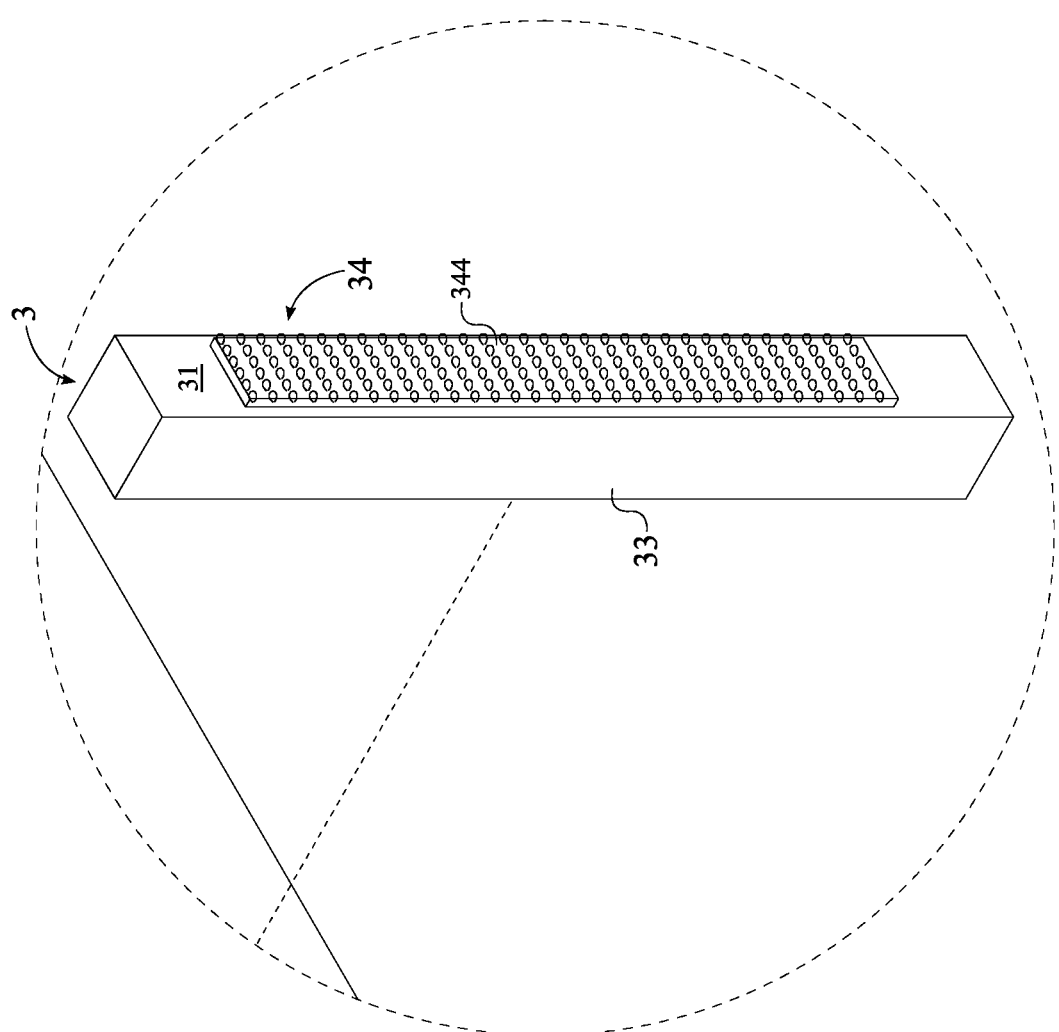
FIG. 9 is a detail view taken about section 6 in FIG. 5, showing an embodiment of the plurality of supports with the loop portion of a hook-and-loop fastener.

Referring to FIG. 9, in another possible embodiment, the mounting mechanism 34 comprises a loop portion 344 of a hook-and-loop fastener. In this embodiment, a hook portion of the hook-and-loop fastener is attached to the desired anchoring point, to allow the loop portion 344 to releasably connect thereon. Accordingly, the loop portion 344 is connected onto the mounting side 31, opposite the connecting side 32. To mount the mounting structure 2, the loop portion 344 is positioned coincident to the hook portion on the anchoring point, thereby creating a releasable connection. The application of a pulling force perpendicular to the pillar 33 disengages the loop portion 344 from the hook portion on the anchoring point.

Although the invention has been explained in relation to its preferred embodiment, it is to be understood that many other possible modifications and variations can be made without departing from the spirit and scope of the invention as hereinafter claimed.

What is claimed is:

1. A pad holder for a training pad used to housetrain pets comprises:
    a plurality of pad fasteners;
    a mounting structure;
    a plurality of supports;
    the plurality of pad fasteners being laterally mounted onto the mounting structure;
    the plurality of supports being laterally mounted onto the mounting structure, opposite the plurality of pad fasteners;
    the plurality of pad fasteners being distributed along a longitudinal axis of the mounting structure;
    the plurality of supports being distributed along the longitudinal axis of the mounting structure;
    each of the plurality of pad fasteners comprises an oblong tube, a flexible panel, an opening, and a plurality of gripping teeth;
    the first surface and the second surface being positioned opposite each other about the mounting structure;

the oblong tube being connected laterally onto the first surface;
the flexible panel being terminally connected to the oblong tube, opposite the first surface;
the opening traversing through the flexible panel into the oblong tube;
the plurality of gripping teeth being delineated by the opening;
the mounting structure comprises a first surface and a second surface;
each of the plurality of supports comprises a pillar and a mounting mechanism;
the pillar being laterally mounted onto the second surface; and
the mounting mechanism being laterally mounted onto the pillar, opposite the second surface;
the mounting mechanism comprises a plurality of threaded holes;
each of the plurality of supports further comprises a mounting side and a connecting side;
the mounting side and the connecting side being positioned opposite each other about the pillar;
the connecting side being mounted coincident to the second surface;
the plurality of threaded holes traversing into the mounting side of the pillar; and
the plurality of threaded holes being distributed along the length of the pillar.

2. The pad holder for a training pad used to housetrain pets as claimed in claim 1 comprises:
the mounting mechanism comprises an adhesive strip;
each of the plurality of supports further comprises a mounting side, and a connecting side;
the mounting side and the connecting side being positioned opposite each other about the pillar;
the connecting side being mounted coincident to the second surface; and
the adhesive strip being connected onto the mounting side, opposite the connecting side.

3. The pad holder for a training pad used to housetrain pets as claimed in claim 1 comprises:
the mounting mechanism comprises a hook portion of a hook-and-loop fastener;
each of the plurality of supports further comprises a mounting side and a connecting side;
the mounting side and the connecting side being positioned opposite each other about the pillar;
the connecting side being mounted coincident to the second surface; and
the hook portion being connected onto the mounting side, opposite the connecting side.

4. The pad holder for a training pad used to housetrain pets as claimed in claim 1 comprises:
the mounting mechanism comprises a loop portion of a hook-and-loop fastener;
each of the plurality of supports further comprises a mounting side and a connecting side;
the mounting side and the connecting side being positioned opposite each other about the pillar;
the connecting side being mounted coincident to the second surface; and
the loop portion being connected onto the mounting side, opposite the connecting side.

5. A pad holder for a training pad used to housetrain pets comprises:
a plurality of pad fasteners;
a mounting structure;
a plurality of supports;
the plurality of pad fasteners being laterally mounted onto the mounting structure;
the mounting structure comprises a first surface and a second surface;
each of the plurality of pad fasteners comprises an oblong tube, a flexible panel, an opening, and a plurality of gripping teeth;
the plurality of supports being laterally mounted onto the mounting structure, opposite the plurality of pad fasteners;
the plurality of pad fasteners being distributed along a longitudinal axis of the mounting structure;
the plurality of supports being distributed along the longitudinal axis of the mounting structure;
the first surface and the second surface being positioned opposite each other about the mounting structure;
the oblong tube being connected laterally onto the first surface;
the flexible panel being terminally connected to the oblong tube, opposite the first surface;
the opening traversing through the flexible panel into the oblong tube;
the plurality of gripping teeth being delineated by the opening;
each of the plurality of supports comprises a pillar and a mounting mechanism;
the pillar being laterally mounted onto the second surface;
the mounting mechanism being laterally mounted onto the pillar, opposite the second surface;
the mounting mechanism comprises an adhesive strip;
each of the plurality of supports further comprises a mounting side, and a connecting side;
the mounting side and the connecting side being positioned opposite each other about the pillar;
the connecting side being mounted coincident to the second surface; and
the adhesive strip being connected onto the mounting side, opposite the connecting side.

6. The pad holder for a training pad used to housetrain pets as claimed in claim 5 comprises:
the mounting mechanism comprises a plurality of threaded holes;
each of the plurality of supports further comprises a mounting side and a connecting side;
the mounting side and the connecting side being positioned opposite each other about the pillar;
the connecting side being mounted coincident to the second surface;
the plurality of threaded holes traversing into the mounting side of the pillar; and
the plurality of threaded holes being distributed along the length of the pillar.

7. The pad holder for a training pad used to housetrain pets as claimed in claim 5 comprises:
the mounting mechanism comprises a hook portion of a hook-and-loop fastener;
each of the plurality of supports further comprises a mounting side and a connecting side;
the mounting side and the connecting side being positioned opposite each other about the pillar;
the connecting side being mounted coincident to the second surface; and
the hook portion being connected onto the mounting side, opposite the connecting side.

8. The pad holder for a training pad used to housetrain pets as claimed in claim 5 comprises:

the mounting mechanism comprises a loop portion of a hook-and-loop fastener;
each of the plurality of supports further comprises a mounting side and a connecting side;
the mounting side and the connecting side being positioned opposite each other about the pillar;
the connecting side being mounted coincident to the second surface; and
the loop portion being connected onto the mounting side, opposite the connecting side.

\* \* \* \* \*